Oct. 24, 1950     J. L. HAYNES     2,527,008
RAILROAD CAR TRUCK
Filed March 15, 1945     4 Sheets-Sheet 1
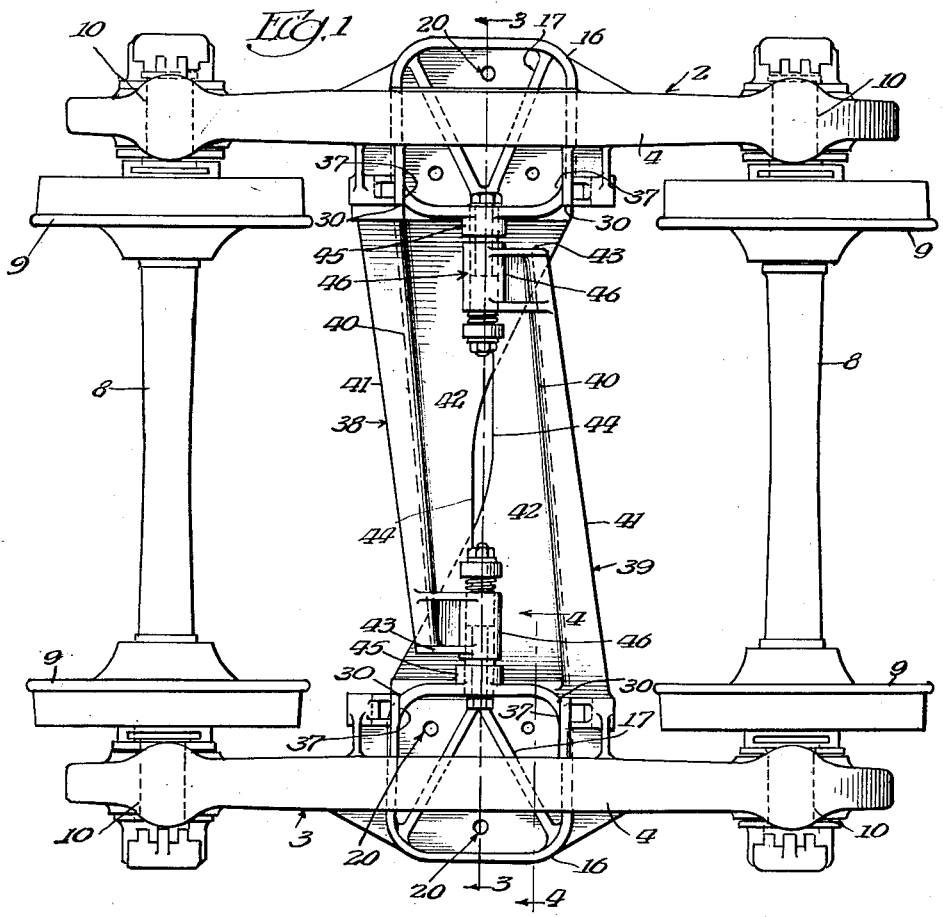
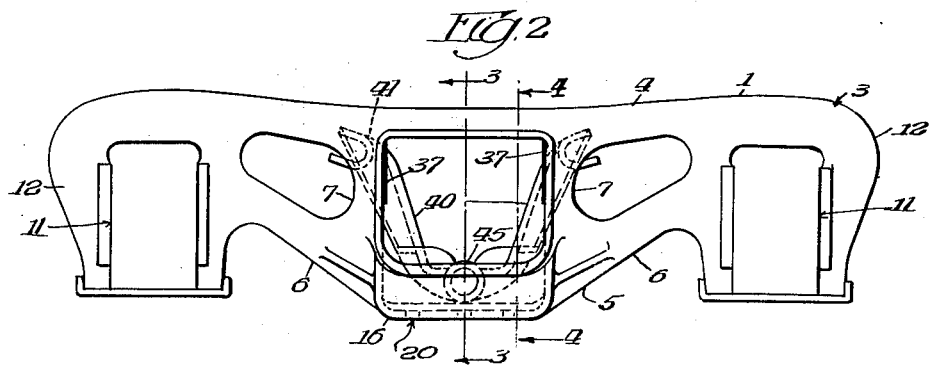
Inventor
James L. Haynes,
By Spencer, Marzall, Johnston & Cook, Attys.

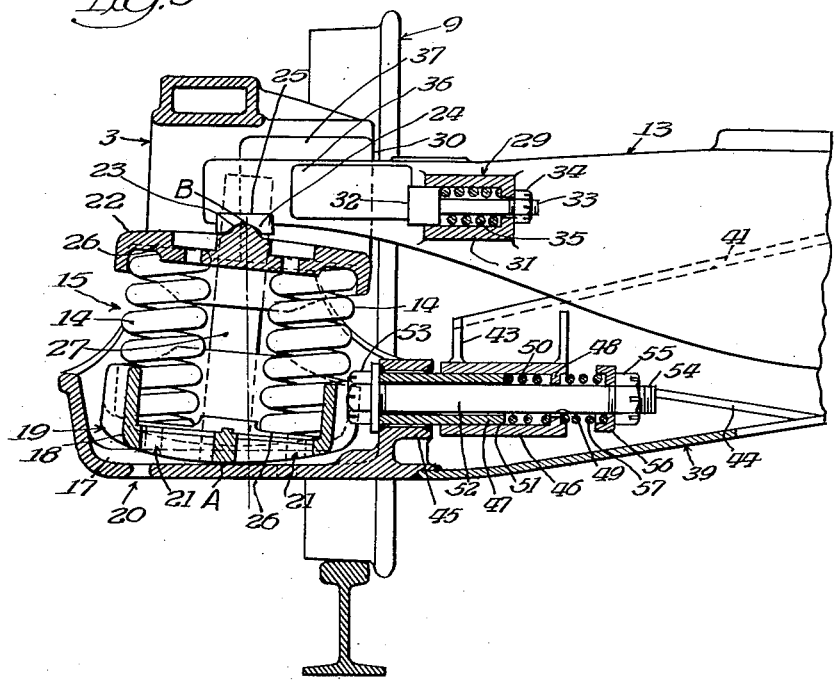
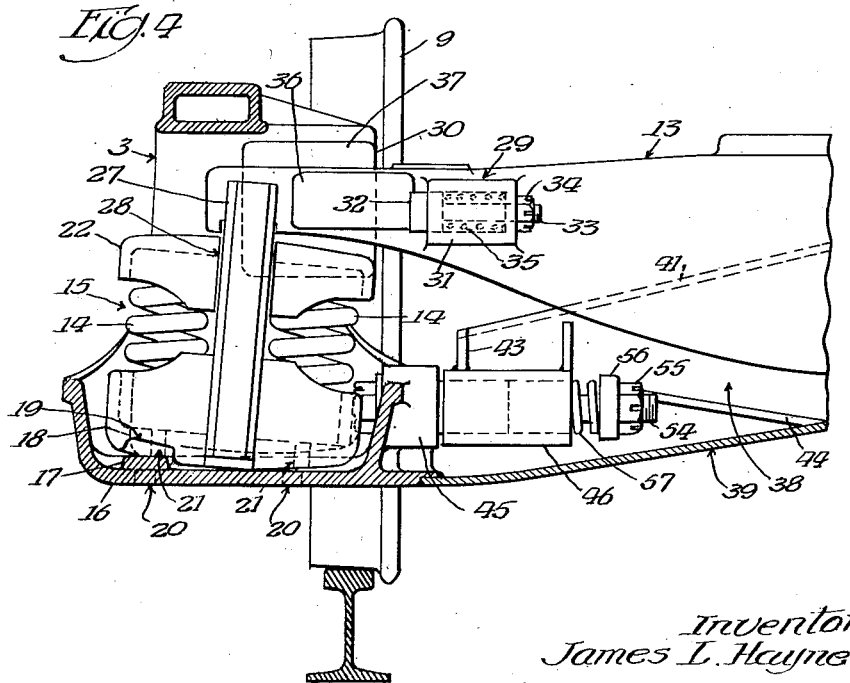

Oct. 24, 1950        J. L. HAYNES        2,527,008
RAILROAD CAR TRUCK
Filed March 15, 1945        4 Sheets-Sheet 3
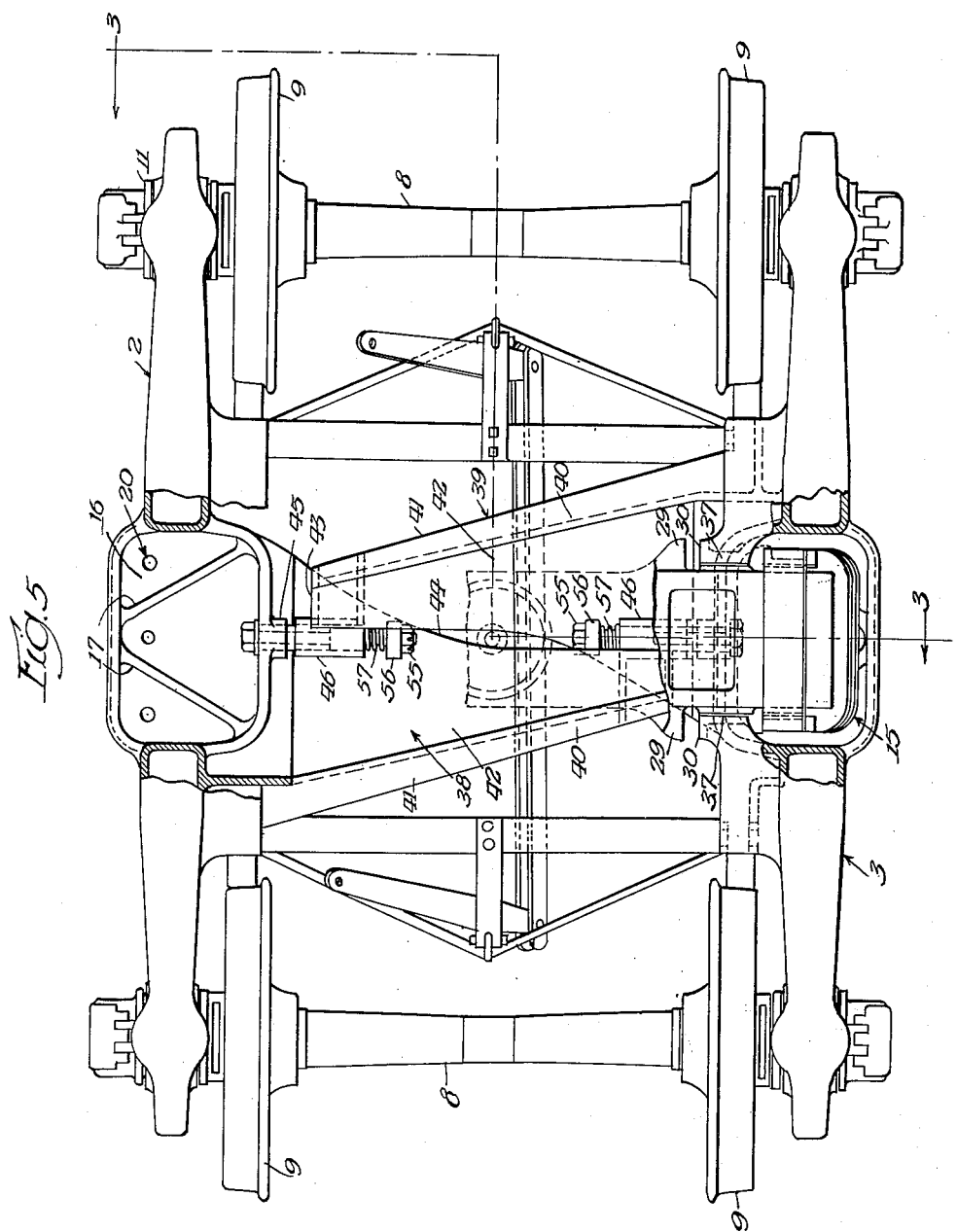
Inventor:
James L. Haynes,
By Spencer, Marzall, Johnston & Cook,
Attys.

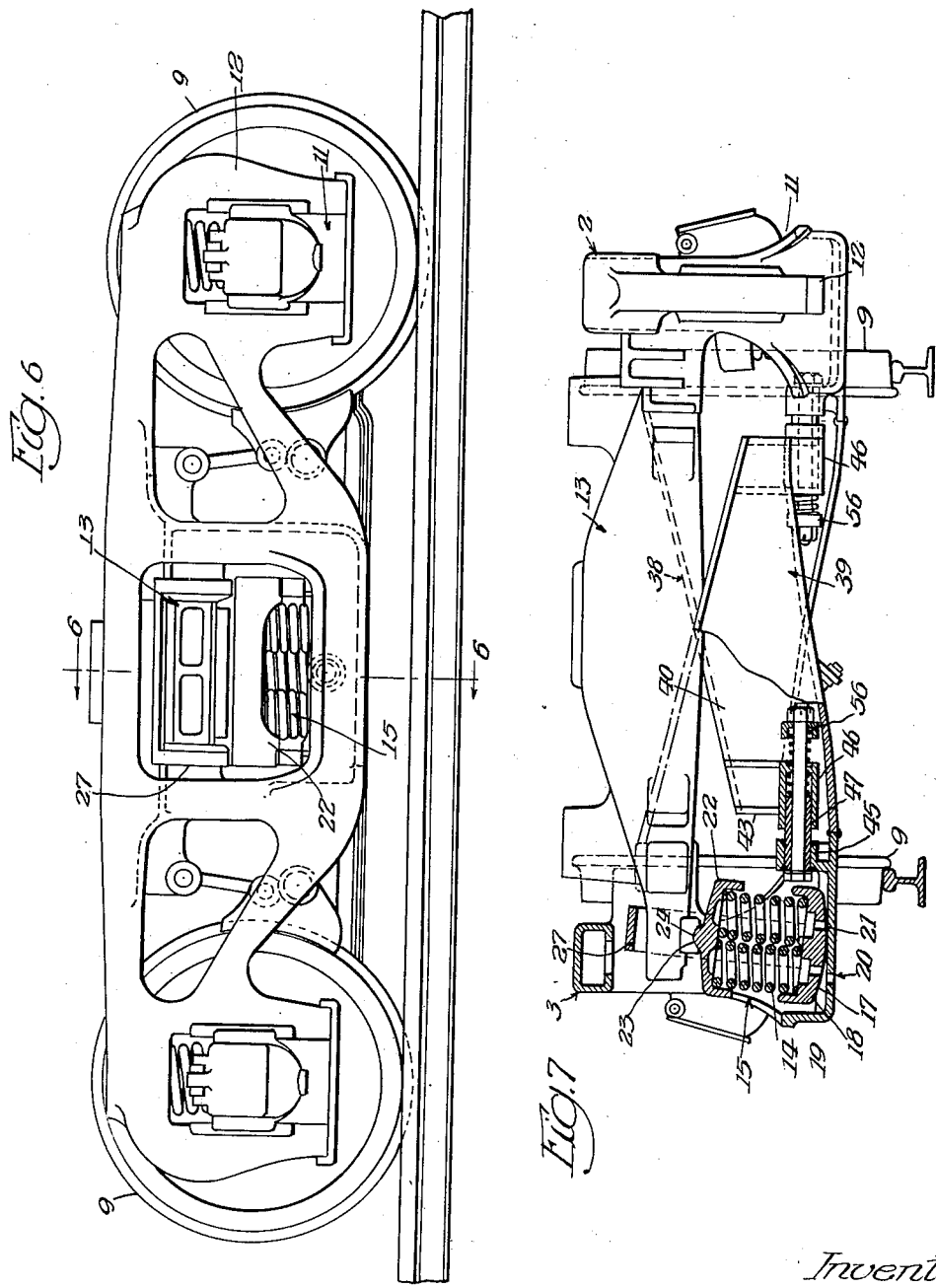

UNITED STATES PATENT OFFICE 2,527,008

RAILROAD CAR TRUCK

James L. Haynes, Glen Ellyn, Ill.

Application March 15, 1945, Serial No. 582,845

4 Claims. (Cl. 105—198)

This invention relates to railroad car trucks in general and particularly though not exclusively to freight car trucks.

Passenger car trucks are generally provided with a swinging type of support for the bolster and its springs. This swing support operates so as to reduce or smooth out the horizontal lateral forces due to the side motion of the wheels, axles, bearings and brake rigging relative to the truck frame, bolster and car body, thus improving the riding qualities of the car.

Conventional freight trucks do not have the riding qualities required for use on modern high speed freight service largely because there is no lateral swing motion support for the bolster and, while it is highly desirable to attain the same riding qualities in freight car trucks as are inherent in present high speed passenger car trucks, the substitution of passenger trucks for freight car trucks would be prohibitive because of cost and because of certain standards required by the A. A. R. interchange rules. Freight car trucks, therefore, must be made to conform to certain requirements as to height and other dimensions and at the same time must be kept low in manufacturing cost. It is not only undesirable but impractical, if not impossible, to substitute certain parts of passenger car trucks for certain standard parts of freight car trucks. However, it is desirable that certain swing motion inherent in high speed passenger trucks be embodied in freight car trucks but constructed and arranged to be competitive with conventional freight car trucks of the standard type in which no swing motion is provided. It is, therefore, the purpose of the present invention to provide suitable mechanical means for obtaining easy, smooth side motion of the bolster relative to the truck frames, so as to provide the proper swing motion to permit cars, so equipped, to run at a faster speed without dangerous swaying motion and without damage to lading.

The primary object of the invention is to provide a new and novel truck construction, particularly for use on freight cars, whereby there is provided an element having swing motion and positioned between the bolster and the side frames of the truck which can be readily and economically manufactured, which will produce relatively the same locus of the ends of the bolster, as obtains with long swing hangers, through the means of a rocking device whose curvature can be made so as to produce any desired degree of movement at the bolster.

Another important object of the invention is the provision of a rocking member of new and novel construction which is adapted to be applied to the truck construction so as to provide a certain amount of swing support whereby jars and jerks will be overcome during fast movement of the trucks along the rails, particularly as the car goes around curves, and to assist the desired control of the rocking or swing motion by suitable formation of the side frame surfaces which support the rockers.

A still further object of this invention is the provision of a railroad car truck which is provided with suitable means for transmitting the gravity load on the truck bolster to the side frames so as to permit relative lateral movement of the bolster and side frames to occur with minimum shock and, therefore, provide easy riding qualities of the car.

Still another object of the invention is the provision of a railroad car truck which is provided with a rocking member supported on the parts of the side frames of the truck which act as a base or platform upon which the rocking member operates, there being suitable interengaging means between the rocker element and its supporting platform so as to prevent any relative axial or circumferential displacement between the platform and the rocker whereby to maintain constant relative arcuate locations of the points of engagement between the rocking member and its cooperating supporting platform.

Still another object of the invention is the provision of a new and improved railroad car truck which incorporates the vertical springs to cushion the gravity loads in the usual manner, the springs being interposed between the rocking member which engages the supporting platform and an upper member cooperating with the rocker member, which upper member has pivotal engagement with the underside of the bolster whereby there is obtained the proper side swing motion as well as the proper vertical cushioning effect.

It is intended also that the pivotal engagement of the upper member and the underside of the bolster may be replaced by having these members rock with respect to each other, using the same method of engagement as that employed between the lower rocking member and the supporting platform.

Numerous other objects and advantages will be apparent throughout the progress of the following specification.

The accompanying drawings illustrate certain selected embodiments of the invention and the views therein are as follows:

Fig. 1 is a detail plan assembly of a freight car truck and embodying the invention;

Fig. 2 is a detail side elevation of the frame structure shown in Fig. 1;

Fig. 3 is a detail vertical partial sectional view along line 3—3 of the car truck shown in Figs. 1 or 2 but including certain elements such as the springs and pivot connection as described in applicant's copending application Serial No. 582,846, filed March 15, 1945;

Fig. 4 is a detail vertical partial sectional view along line 4—4 of the car truck shown in Figs. 1 or 2 but showing an external view of the rocking device and certain other parts which are shown in cross section in Fig. 3;

Fig. 5 is a detail plan view of another form of railroad truck with parts broken away for clearness and embodying the invention;

Fig. 6 is a detail elevational view of the truck shown in Fig. 5 and embodying the invention; and Fig. 7 is a detail sectional view on the line 6—6 of Fig. 6 and is also a detail partial sectional view on the line 3—3 of Fig. 5 with certain parts removed for the sake of clearness.

The particular construction herein shown for the purpose of illustrating the invention comprises a railroad car truck 1, Figs. 1 to 4, having oppositely disposed side frames 2 and 3. The side frames 2 and 3 each comprises a longitudinal forward to rearwardly extending top member 4 and a bottom member 5. Each bottom member 5 is integrally connected to the top member 4 by upwardly converging integral lower parts or members, 6, 6. Vertically extending members or columns 7, 7 are connected to the upper and lower members 4 and 5 as clearly shown in Fig. 2.

Transverse axles 8, 8, which carry the wheels 9, have the usual exterior journal portion 10 which is received within the usual journal boxes, the journal boxes being received in the pedestal opening 11 of the pedestals 12. A bolster 13 extends transversely across the truck and is suitably supported on springs 14 for providing the necessary vertical cushion effect.

The bolster is adapted to cooperate with means for controlling the swinging or rocking motion of the car so as to render easy riding at high speeds, particularly when the car is going around curves. The means for controlling this rocking motion comprises a rocker element 15 for each of the side frames. The rocker element is rockingly supported on a part 16 formed integrally with the side frames. The upper side of each support 16 is provided with one or more continuous rib formations 17 in the form of a herringbone gear tooth and is adapted to have interfitting relation with the lower member 18 of the rocker element 15 which is mounted on top of the frame part 16. The lower surface of the member 18 is provided with a recess or groove formation 19 to receive a rib formation 17 on the upper side of the frame part 16.

The interengaging means between the rocker and its supporting platform is shown as a rib 17 on the platform engaging a complementary recess in the bottom of the rocker, and if this construction is employed, it is desirable to provide drain or weep holes 20 in the bottom of the platform 16 whereby any condensation or water will be free to drain out. However, the invention contemplates the reversal of parts whereby the platform 16 may have one or more grooves therein and the bottom of the rocker may have the rib construction in complementary engagement therewith. Should the latter construction be employed, the weep holes 20 would be provided in the grooves in the platform to permit the drain of condensation or water.

In a similar manner, drain holes 21 are to be provided in the bottom of member 18, as shown in Figs. 3 and 4, to remove any water that may tend to accumulate in the lower member 18.

The member 18 of the rocker element 15, therefore, is free to have arcuate or cam-like movement with respect to its base or support part 16 but is always maintained in proper operative position by the engagement of the rib portion 17 with the groove portion 19. The rocker element 15 includes an upper member 22 which is provided with a longitudinally extending rib-like extension 23 operatively engaging a groove 24 formed on the underside of a projecting element 25 secured to the underside of the bolster 13. The springs 14 are adapted to be arranged between the members 18 and 22, the said members being recessed as at 26, 26 to accommodate the ends of the springs 14 and to assist in maintaining the springs in proper position and to prevent movement thereof with respect to the upper and lower member. Guide bars or members 27, as shown in Figs. 3 and 4, are fixed on each side of the lower member 18 and extend upwardly a predetermined distance above the upper end of the upper members 22 of each rocking element 15. These guide members 27 not only prevent wobbling movement of the springs, but also act to maintain the upper members 22 in proper relative position with respect to the springs 14 and lower member 18. The upper members 22 are provided with grooves or recesses 28 on each side thereof, into which the upper end of the guide members 27 are received. Therefore, any swaying movement of the car which is transmitted to the upper members 22 will in turn be transmitted to the lower member 18, causing rocking movement of the entire rocker element 15. The parts 18, 27, 22 and the springs 14 thereby act as a unit to dampen the the rocking or swaying movement of the car together with the cushioning effect for vertical shocks provided by the springs 14. The bolster 13 is provided with a suitable engaging groove for the projecting element 25. The bolster 13 is provided with outwardly extending stops 29, 29 on each side thereof which are adapted for engagement with cooperating lugs 30, 30 formed on the side frames so as to limit the amount of rocking movement whereby normal rocking movement within the proper limits will be effected by the rocker element 15 but exceptional or dangerous rocking movement will be overcome because the stops 29 on the bolster will engage the cooperating lugs 30 on the frame. The lower face or rocker surface of each lower rocker member 18 is formed on a curve designed such that the point of contact A between the said lower rocker member and its supporting platform 16 is always located outwardly of a vertical plane passing through the point of contact B between the element 25 and the rib-like extension 23, regardless of the transverse position of the bolster 13 with respect to the side frames of the truck, as clearly shown in Fig. 3.

The bolster is centered by the force of gravity which is caused to produce a horizontal inwardly acting transverse force at each roocker, due to the special curved forms or contours of the surface of the rocker elements in contact with the supporting platforms.

The stops 29, in Figs. 3 and 4, consist of cylindrical members 31 which are attached at both sides of each end of the bolster 13 and are so designed as to retain the plunger 32, having an extended threaded end 33 which is held by the nut 34 so as to slightly preload the springs 35. Thus, when there is excessive end movement of the bolster 13, the contact of plunger 32 against the lug 30 dampens the movement of the bolster gradually due to the cushioning effect of the spring 35.

The truck is constructed and arranged so as to provide pads 36, 36 on each side of the bolster at the opening in the side frames through which the bolster extends so that there will be no excessive longitudinal movement caused by sudden acceleration or deceleration. The pads 37 are provided on the sides of the opening in the side frame and arranged so as to engage the pads 36 of the bolster.

The construction shown in Figs. 5 to 7, inclusive, discloses a railroad truck which is adapted for passenger car service. This truck, Figs. 5 to 7, comprises the same elements above described and having the rocker element 15 provided thereto whereby the truck, Figs. 5 to 7, may have the improved rocker construction as well as freight car trucks of the general type disclosed in Figs. 1 to 4.

The truck construction disclosed in Figs. 1 to 7, inclusive, may include means for maintaining the side frames 2 and 3 in proper parallelism and to prevent one frame from creeping or getting ahead of its cooperating side frame. The means for maintaining parallelism is disclosed and claimed in applicant's copending application Serial No. 577,191, filed February 10, 1945, now Letters Patent No. 2,477,517, patented July 26, 1949. This means comprises transversely extending bars 38 and 39 rigidly secured to the side frames 2 and 3, respectively. The bar 38 is of angulated construction having a vertically extending body 40, an upwardly outwardly extending flange portion 41, and a relatively horizontally inwardly extending lateral portion 42. An end section 43 is integrally connected with the vertical portion 40 and the lower inwardly extending portion 42. The inner edge 44 of the horizontally extending portion 42 is curved as indicated, Figs. 1 and 5, so as to have movement corresponding with the similar edge 44 of the member 39 so that movement of one side frame in a vertical arc will be mutual with respect to the movement of the other side frame in a vertical arc without obstruction between the members 38 and 39 throughout a considerable angular movement. One end of the member 38 is rigidly secured to the side frame 2 by welding or other means. The side and bottom parts 40 and 42, respectively, are relatively wide at the point of attachment and then taper toward their outer ends which are relatively narrow.

The bar 39 is constructed identically with the member 38 and includes the same parts 40, 41, 42 and 43 with a cooperating curved edge 44. Annular bosses 45, 45 may be provided on the side frames 2 and 3 and these bosses are preferably cast integrally with the side frames. Cylindrical bearings 46, 46 are rigidly secured to the free ends of the members 38 and 39, there being a sleeve 47 operatively received in each boss 45 and welded to the boss while being held in proper accurate position. The sleeve 47 is received within a cooperating bearing 46 as clearly shown in Figs. 1, 3, 4, 5 and 7. The sleeve 47 is shorter in length than the distance between the opposed ends of the bosses 45 and the bearings 46 as clearly shown in Figs. 3 and 4. One end of the bearing 46 may be provided with an annular wall 48 in which a circular opening 49 is provided. A coiled spring 50 is arranged between the end 51 of the sleeve 47 and the annular wall 48. A round rod 52 extends through the sleeve and through the circular opening 49 being held against the boss 45 by a nut and washer construction 53. The other end of the rod 52 is threaded as indicated at 54 and receives a nut 55. A cup-shaped member 56 is mounted on the rod 52 adjacent to the nut 55, and a lock spring 57 is interposed between the outer end of the annular wall 48 and the cup-shaped member 56 for the purpose of providing a spring resistance against side thrusts between the two side frame members 2 and 3. The springs 50 and 57 are preloaded by tightening up the nut 55 on the rod 52 so that there is a definite resistance to moving the two side frames 2 and 3 relative to each other inwardly or outwardly, depending upon the amount of preload provided in the springs 50 and 57. Other resilient means, such as rubber springs, may be used in place of the coil springs 50 and 57. The purpose of this provision is to facilitate the partial equalization of thrust loads which must be transmitted from the bearings on the journals to the side frames when rounding curves. By proper control of the lateral clearances between the thrust resisting flanges on the journal boxes and the thrust surfaces of the truck pedestal ways, the total thrust which must be transmitted between the axles and the truck frames can be partially equalized between the two side frames because after contact occurs at the pairs of thrust surfaces of the journal boxes and pedestal ways at one truck frame, the deflections of the preloaded springs 50 and 57 will permit relative movement in parallel position between the two side frames until the thrust transmitting surfaces at the opposite side frame come into contact with the cooperating thrust flanges on the journal boxes and thereby carry the remaining part of the thrust load which has been imposed.

The invention provides a truck construction whereby the car mounted on the trucks is free to have free arcuate movement horizontally within certain limits, there being means provided between the bolster and the rocker member to prevent excessive rocking movement so that the car will always be smooth riding.

Also, the invention provides for means for maintaining the side frames in proper parallelism and in proper relative position with each other. Means are provided to closely restrict the relative movement between the bolster truck frames caused by great or quick acceleration and deceleration, and thereby remove from the springs and the rocking elements any excessive loads that might result from emergency brake applications, etc.

Changes may be made in the form, construction and arrangement of the parts without departing from the spirit of the invention or sacrificing any of the advantages thereof, and the right is hereby reserved to make all such changes as fairly fall within the scope of the following claims.

The invention is hereby claimed as follows:

1. A railroad car truck comprising side frames, rocking members carried by the side frames, a bolster operatively mounted on said rocking members, means pivotally supporting said bolster to said rocking members, and a member rigidly connected to each frame and having pivotal and slidable engagement with the other frame to maintain said frames in spaced apart relationship and maintaining said frames at all times in parallelism.

2. A railroad car truck comprising transversely spaced apart side frames, a rocker supporting platform on each frame, a rocker member having a transversely curved bottom rockingly mounted on each platform for transverse rocking movement, a bolster mounted on each rocker member, and means for preventing longitudinal movement of each rocker member with respect to its platform, said last named means comprising diagonally disposed ribs on the platforms engaging complementary grooves on the bottoms of the rocker members.

3. A railroad car truck comprising transversely spaced apart side frames, a rocker supporting platform on each frame, a rocker member having a transversely curved bottom rockingly mounted on each platform for transverse rocking movement, a bolster rockingly mounted on said rocker members for transverse rocking movement, means to prevent longitudinal movement of said bolster on said rocker members, a member having one end rigidly secured to one frame and pivotally engaging a part on the other frame, and a second member rigidly secured to the last named frame and pivotally engaging a part on the said next to the last named frame, the last two said members operating to maintain said side frames at all times in parallel planes.

4. A railroad car truck embodying transversely spaced apart side frames, a rocker supporting platform on each of said frames, a rocker element mounted on each platform for transverse rocking movement, each of said rocker elements embodying a top and bottom member, resilient elements disposed between said members and within the rocker element, the outer faces of said members being curved transversely with respect to the side frames, means connected with one of said members and slidingly engaging the opposite member, a bolster mounted upon each of the rocker elements, and diagonally disposed ribs on the platform engaging complementary grooves in the bottom members of the rocker elements.

JAMES L. HAYNES.

REFERENCES CITED

The following references are of record in the file of this patent:

UNITED STATES PATENTS

| Number | Name | Date |
|---|---|---|
| 450,627 | Krehbiel | Apr. 21, 1891 |
| 586,482 | Floyd | July 13, 1897 |
| 757,852 | Washburn | Apr. 19, 1904 |
| 822,112 | Gebhardt | May 29, 1906 |
| 825,255 | Whitman | July 3, 1906 |
| 1,640,180 | Buckwalter | Aug. 23, 1927 |
| 2,015,025 | Barrows | Sept. 17, 1935 |
| 2,063,739 | Hedgcock et al. | Dec. 8, 1936 |
| 2,267,589 | Eksergian | Dec. 23, 1941 |